(12) United States Patent
Lu et al.

(10) Patent No.: US 11,545,827 B2
(45) Date of Patent: Jan. 3, 2023

(54) SURGE PROTECTION APPARATUS HAVING EMBEDDED FUSE

(71) Applicant: Littelfuse Semiconductor (Wuxi) Co., Ltd., Nuxi (CN)

(72) Inventors: Kueir-Liang Lu, Hsinchu County (TW); Lei Shi, Jiangsu (CN); Chao Yi Chang, Hsinchu County (TW); Chuan Fang Chin, Taoyuan (TW)

(73) Assignee: Littelfuse Semiconductor (Wuxi) Co., Ltd, Wuxi (CN)

( * ) Notice: Subject to any disclaimer, the term of this patent is extended or adjusted under 35 U.S.C. 154(b) by 272 days.

(21) Appl. No.: 16/500,737

(22) PCT Filed: Sep. 5, 2016

(86) PCT No.: PCT/CN2016/098016
§ 371 (c)(1),
(2) Date: Oct. 3, 2019

(87) PCT Pub. No.: WO2018/040080
PCT Pub. Date: Mar. 8, 2018

(65) Prior Publication Data
US 2021/0288491 A1    Sep. 16, 2021

(51) Int. Cl.
*H02H 9/04* (2006.01)
*H01C 7/02* (2006.01)
*H02H 9/02* (2006.01)

(52) U.S. Cl.
CPC ............. *H02H 9/042* (2013.01); *H01C 7/02* (2013.01); *H02H 9/026* (2013.01)

(58) Field of Classification Search
CPC ........... H02H 9/042; H02H 9/026; H01C 7/02
(Continued)

(56) References Cited

U.S. PATENT DOCUMENTS 6,377,435 B1 * 4/2002 Nabell .................... H01C 1/16
361/119
6,532,140 B1 * 3/2003 McMahon ........... H02H 1/0015
361/54
(Continued)

FOREIGN PATENT DOCUMENTS

CN     101174745 A     5/2008
CN     101233585 A  *  7/2008  ............ H02H 9/042
(Continued)

OTHER PUBLICATIONS

Zhenmin, et al., "SIDACtor Transient over-current and protector and its urgent use", Foreign Electric, Yuan Department Approval, No. 12, Dec. 1999.
(Continued)

*Primary Examiner* — Thienvu V Tran
*Assistant Examiner* — Sreeya Sreevatsa
(74) *Attorney, Agent, or Firm* — KDB Firm PLLC (57) ABSTRACT

A surge protection apparatus may include an input terminal; an output terminal, the output terminal electrically coupled to the input terminal; a ground terminal, the ground terminal electrically coupled to the input terminal and output terminal; a positive temperature coefficient (PTC) fuse, the PTC fuse connected in electrical series between the input terminal and output terminal; a crowbar device, the crowbar device electrically connected to the ground terminal and output terminal, wherein the crowbar device is in electrical series with the PTC fuse between the input terminal and ground terminal; and a central frame portion, the central frame portion electrically coupled to the input terminal, output terminal and ground terminal, wherein the crowbar device is disposed on a first side of the central frame portion and the PTC fuse is disposed on a second side of the central frame portion, opposite the first side.

10 Claims, 8 Drawing Sheets

(58) Field of Classification Search
USPC .................................................. 361/56, 54
See application file for complete search history.

(56) References Cited

U.S. PATENT DOCUMENTS

| | | | |
|---|---|---|---|
| 6,919,625 B2* | 7/2005 | O'Shea | H01L 23/49524 257/685 |
| 7,180,719 B2* | 2/2007 | Whitney | H01L 23/60 361/103 |
| 7,660,096 B2 | 2/2010 | Golubovic et al. | |
| 3,711,532 A1 | 4/2014 | Pfenningstorf | |
| 10,181,368 B2 | 1/2019 | Ye et al. | |
| 2004/0246645 A1* | 12/2004 | Schilling | H04M 3/18 361/119 |
| 2007/0025044 A1* | 2/2007 | Golubovic | H01C 7/102 361/124 |
| 2007/0217110 A1* | 9/2007 | Lu | H02H 9/042 361/118 |
| 2008/0192394 A1* | 8/2008 | Harris | H02H 9/025 361/56 |
| 2009/0002908 A1 | 1/2009 | Chiang | |
| 2012/0127619 A1* | 5/2012 | Mikolajczak | H02H 3/023 29/592.1 |
| 2014/0268443 A1* | 9/2014 | Nassar | H02H 9/04 361/56 |
| 2016/0049784 A1* | 2/2016 | Ye | H02H 9/026 361/91.5 |

FOREIGN PATENT DOCUMENTS

| | | | | |
|---|---|---|---|---|
| CN | 101233585 | A | 7/2008 | |
| CN | 102545191 | A | 7/2012 | |
| CN | 102956635 | A | 3/2013 | |
| CN | 103311914 | A | 9/2013 | |
| CN | 204012692 | U | 12/2014 | |
| CN | 104779601 | A | 7/2015 | |
| DE | 3621200 | A1 | 1/1988 | |
| EP | 0690539 | A2 * | 1/1996 | H02H 9/042 |
| KR | 2008-0034487 | A | 4/2008 | |
| KR | 101222926 | B1 * | 2/2013 | |
| WO | WO-0059094 | A2 * | 10/2000 | H02J 7/00308 |

OTHER PUBLICATIONS

International Search Report from PCT/CN2016/098016, dated Jun. 13, 2017, 3 pages.
Written Opinion from PCT/CN2016/098016, dated Jun. 13, 2017, 4 pages.
International Preliminary Report on Patentability (IPRP) from PCT/CN2016/098016, dated Mar. 5, 2019, 5 pages.

* cited by examiner

SURGE PROTECTION APPARATUS HAVING EMBEDDED FUSE

BACKGROUND

Field

Embodiments relate to the field of surge protection devices, and more particularly to overvoltage protection devices and resettable fuses.

Discussion of Related Art

Surge protection devices include over-voltage protection devices used to protect components, apparatus, or systems from damage due to over-voltage fault conditions, as well as fuses used to protect components, apparatus or systems from excessive current flow. In the field of overvoltage protection devices, diodes such as Zener diodes, thyristors, and SIDACtors® are known (® SIDACtor is a trademark of Littelfuse, Inc.). One advantage afforded by crowbar devices, such as silicon controlled rectifiers (SCR) and SIDACtors, is the ability to respond rapidly to an overvoltage event and clamp the voltage to an acceptable level. In particular, when current flowing through the SIDACtor exceeds a switching current, the SIDACtor acts as a "crowbar" and simulates a short circuit condition. Unlike conventional transient voltage suppression (TVS) clamping devices such as diodes, the advantage of a crowbar type protection device is that the crowbar protection device is not damaged by overvoltage. When flowing current exceeds the maximum on-state current rating, however, a crowbar device such as a SIDACtor may enter a permanent short circuit condition, exposing protected components to potential damage.

With respect to these and other considerations the present disclosure is provided.

SUMMARY

Exemplary embodiments are directed to improved overvoltage protection devices. In one embodiment, a surge protection apparatus may include an input terminal; an output terminal, the output terminal electrically coupled to the input terminal; a ground terminal, the ground terminal electrically coupled to the input terminal and output terminal; a positive temperature coefficient (PTC) fuse, the PTC fuse connected in electrical series between the input terminal and output terminal; a crowbar device, the crowbar device electrically connected to the ground terminal and output terminal, wherein the crowbar device is in electrical series with the PTC fuse between the input terminal and ground terminal; and a central frame portion, the central frame portion electrically coupled to the input terminal, output terminal and ground terminal, wherein the crowbar device is disposed on a first side of the central frame portion and the PTC fuse is disposed on a second side of the central frame portion, opposite the first side.

In another embodiment, a method of a method forming a surge protection apparatus, may include providing an input terminal, an output terminal, and central frame portion; soldering a first side of a semiconductor chip comprising a crowbar device to a first side of the central frame portion; soldering a first portion of a first clip to a second side of the semiconductor chip, the second side being opposite the first side of the semiconductor chip, and soldering a second portion of the first clip to the ground terminal; affixing a first side of a positive temperature coefficient (PTC) fuse to a second side of the central frame portion, the second side of the central frame portion being opposite the first side of the central frame portion, using a conductive medium; affixing a first portion of a second clip to a second side of the PTC fuse, the second side being opposite the first side of the PTC fuse, and affixing a second portion of the second clip to the input terminal.

In a further embodiment, a method of forming a surge protection apparatus, may include providing an input terminal, an output terminal, and central frame portion; soldering a first side of a semiconductor chip comprising a crowbar device to a first side of the central frame portion; soldering a first portion of a first clip to a second side of the semiconductor chip, the second side being opposite the first side of the semiconductor chip, and soldering a second portion of the first clip to the ground terminal; affixing a first side of a ceramic body to a second side of the central frame portion, the second side of the central frame portion being opposite the first side of the central frame portion, using an adhesive; affixing a first portion of a first side of a positive temperature coefficient (PTC) fuse to a second side of the ceramic body, the second side of the ceramic body being opposite the first side of the ceramic body, using an adhesive; affixing a first portion of a second clip to a second side of the PTC fuse, the second side being opposite the first side of the PTC fuse, and affixing a second portion of the second clip to a second side of the central frame portion, the second side opposite the first side of the central frame portion.

BRIEF DESCRIPTION OF THE DRAWINGS

FIG. 1A presents a side view, while

FIG. 2A presents a side view, while

DESCRIPTION OF EMBODIMENTS

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In various embodiments a hybrid apparatus is provided including a resettable fuse and a crowbar device. As used herein the term "crowbar device" may include a known type of electrical circuit that acts as a crowbar, such as a SIDACtor. As is known, a SIDACTor is related to a silicon controlled rectifier (SCR), where an SCR is composed of a layered structure having an arrangement of N-type semiconductor regions or layers as well as P-type semiconductor layers or regions, in a four layer sequence of P-N-P-N, for example. In an SCR a gate is connected to an inner layer of the four layer device, while a SIDACtor lacks such a gate. In various embodiments of the disclosure a crowbar device and a positive temperature coefficient (PTC fuse) are integrated into a 3-terminal apparatus, where the apparatus may be encased in a molded package, or alternatively in a more hollow case. In operation, the first terminal of the apparatus, deemed an input terminal, may be connected to a power or signal input, the second terminal, deemed an output terminal, may be connected to load or output, while the third terminal, a ground terminal, is connected to ground potential.

As detailed below, a PTC fuse is disposed in series between an input terminal and output terminal of an apparatus according to embodiments of the disclosure. One electrode of a device such as a SIDACtor may be connected to ground, while another electrode is shunt to a path from the PTC fuse to the output terminal. This configuration facilitates rapid response to an overvoltage condition using a thyristor, SIDACtor, or similar device, while preventing continuous overcurrent from persisting through the SIDACtor or other device. For example, when a SIDACtor is triggered into on-state during transient events, the overcurrent flowing also through a PTC fuse in the apparatus may gradually heat up the PTC fuse, leading to an increase in resistance of the PTC fuse. The excess current flowing through the apparatus is then limited by the high resistance of the PTC fuse to a constant safe current level. This mechanism prevents SIDACtors from being damaged by continuous overcurrent where a permanent short circuit condition may otherwise result. Once the voltage transients pass, the overcurrent may be removed, resulting in the temperature of the PTC fuse returning to a safe level and automatically resetting the PTC fuse. A SIDACtor may also return to a blocking condition to prevent interference to normal application operations.

Figure 1A:
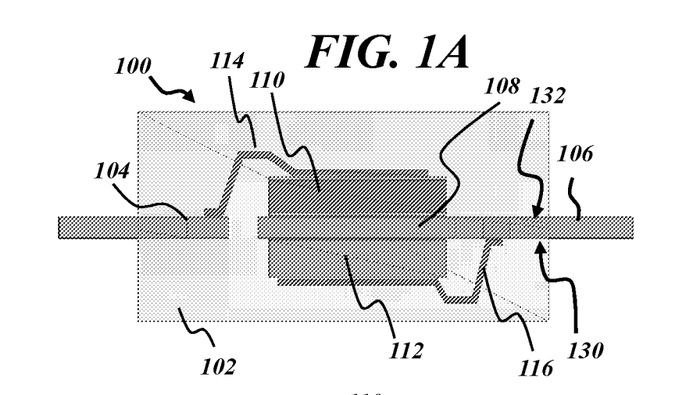
Figure 1B:
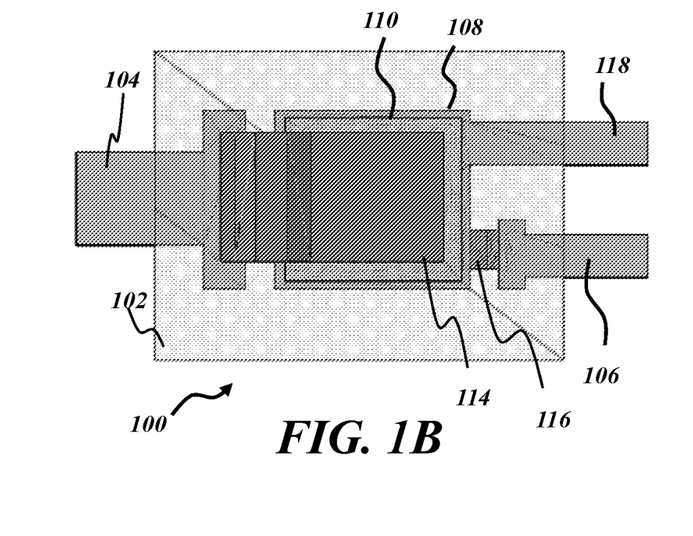
FIG. 1B presents a top plan view of an apparatus 100 according to embodiments of the disclosure.
Figure 1C:
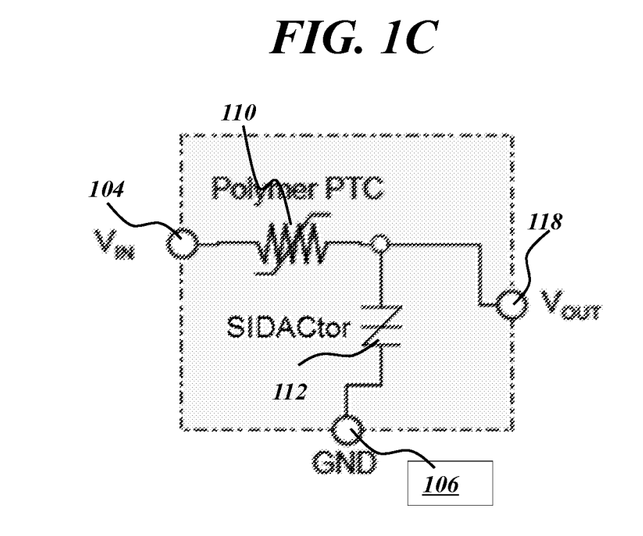
FIG. 1C provides a circuit depiction of the apparatus of FIG. 1A.

FIG. 1A presents a side view, while FIG. 1B presents a top plan view of an apparatus 100 according to embodiments of the disclosure. FIG. 1C shows an electrical circuit representation of the apparatus 100. The apparatus 100 may include a housing 102, such as a molded package, where the housing 102 encloses a hybrid device. The apparatus 100 may include an input terminal 104 and an output terminal 118, where the output terminal 118 is electrically coupled to the input terminal 104. The apparatus 100 may further include a ground terminal 106, wherein the ground terminal 106 is electrically coupled to the input terminal 104 and output terminal 118. While in the example shown, the ground terminal 106, input terminal 104 and output terminal 118 are arranged in a coplanar fashion, the embodiments are not limited in this context. The apparatus 100 may further include a PTC fuse 110, where the PTC fuse 110 is connected in electrical series between the input terminal 104 and output terminal 118. In various embodiments the PTC fuse 110 may be a known fuse such as a Littelfuse POLY-FUSER device. Littelfuse POLY-FUSER devices are polymeric positive temperature coefficient (PPTC) devices offering resettable overcurrent protection (POLY-FUSER is a trademark of Littelfuse, Inc.). The embodiments are not limited in this context.

The apparatus 100 may further include a crowbar device, where the crowbar device is directly electrically connected to the ground terminal 106 and output terminal 118, wherein the crowbar device is also in electrical series with the PTC fuse 110 between the input terminal 104 and ground terminal 106. In various embodiments, the thryistor-type device may be embodied in a semiconductor chip, shown as device chip 112. Unless otherwise noted, the term "device chip" as used herein means a semiconductor chip that contains or embodies a crowbar device. As further shown in FIG. 1A and FIG. 1B, the apparatus 100 may include a central frame portion 108, such as a metal structure, where the central frame portion 108 is electrically coupled to the input terminal 104, output terminal 118, and ground terminal 106. In the example shown, the central frame portion 108 may be integrally formed with the output terminal 118. The embodiments are not limited in this context. As further shown in FIG. 1A, the semiconductor chip is disposed on a first side 130 of the central frame portion 108 and the PTC fuse 110 is disposed on a second side 132 of the central frame portion 108, opposite the first side.

The apparatus 100 further includes a first clip 114, where the first clip 114 is electrically connected to the input terminal 104 and the PTC fuse 110, and also includes a second clip 116, where the second clip 116 is electrically connected to the device chip 112, and the output terminal 118, where the device chip 112 includes a crowbar device. The first clip 114 and second clip 116 may be a metal such as copper, copper alloy or other conductor, and may have a bent structure as shown. This bent structure may be useful to accommodate expansion of movement of components, for example, when heating occurs during an overvoltage condition.

In operation, during an overvoltage event, when a high voltage develops between the input terminal 104 and ground terminal 106, the device in the device chip 112 may act to rapidly clamp the voltage to a target voltage level based on the particular crowbar device such as a SIDACtor formed within the device chip 112. Any overcurrent flowing through the apparatus 100 including through the PTC fuse 110 may gradually heat up the PTC fuse 110 according to the characteristics of the PTC fuse 110, leading to an increase in resistance of the PTC fuse 110. This increased resistance has the effect of limiting the current flowing through the PTC fuse 110 and accordingly limiting the current through device chip 112. This allows the overvoltage protection device within device chip 112 to be automatically reset when the overcurrent condition is removed.

Figure 2A:
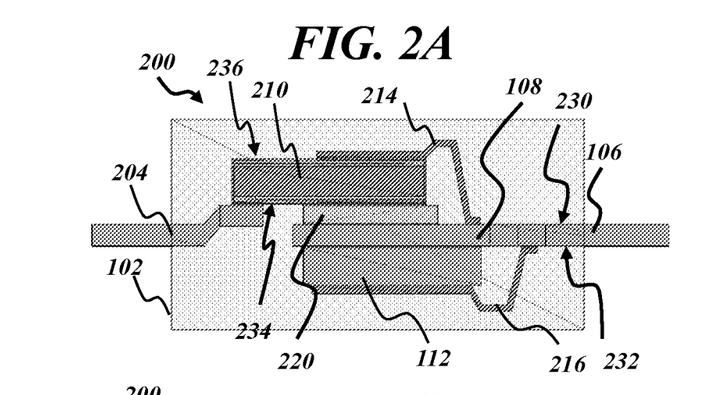
Figure 2B:
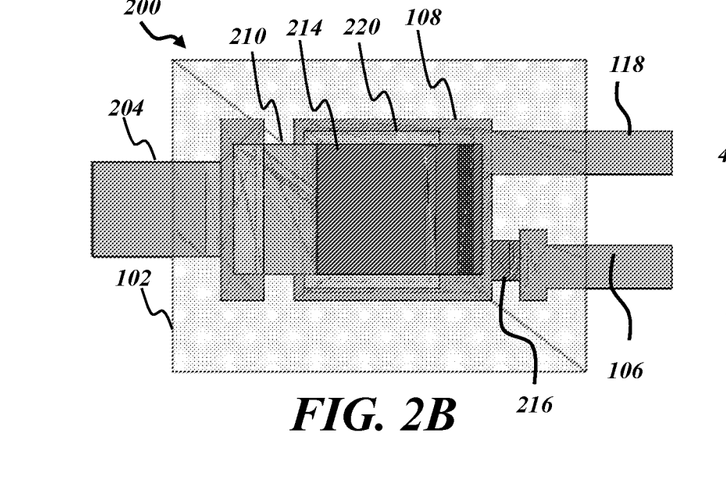
FIG. 2B presents a top plan view of an apparatus 200 according to embodiments of the disclosure.

FIG. 2A presents a side view, while FIG. 2B presents a top plan view of an apparatus 200 according to embodiments of the disclosure. FIG. 1C also shows an electrical circuit representation of the apparatus 200. The apparatus 200 may include a housing 102 generally described above. The apparatus 200 may include an input terminal 204 and an output terminal 118, where the output terminal 118 is electrically coupled to the input terminal 204. The apparatus 200 may further include a ground terminal 106, wherein the ground terminal 106 is electrically coupled to the input terminal 204 and output terminal 118. In the example shown, the input terminal is bent and not completely coplanar with the ground terminal 106 and output terminal 118. The apparatus 200 may further include a PTC fuse 210 having a PTC material generally as described above, where the PTC fuse 210 is connected in electrical series between the input terminal 204 and output terminal. In particular embodiments the outer layers of the PTC fuse 210 may differ from those of PTC fuse 110 as detailed below.

The apparatus 200 may further include the device chip 112 as described above, where the device chip 112 is directly electrically connected to the ground terminal 106 and output terminal 118, wherein device chip is also in electrical series with the PTC fuse 210 between the input terminal 204 and ground terminal 106. As further shown in FIG. 2A and FIG. 2B, the apparatus 200 may include a central frame portion 108, where the central frame portion 108 is electrically coupled to the input terminal 204, output terminal 118, and ground terminal 106. In the example shown, the central frame portion 108 may be integrally formed with the output terminal 118. The embodiments are not limited in this context. As further shown in FIG. 2A, the device chip 112 is disposed on a second side 232 of the central frame portion 108 and the PTC fuse 210 is disposed on a first side 230 of the central frame portion 108, opposite the first side.

The apparatus 200 may differ from the apparatus 100 in further including a ceramic insert 220 disposed between the PTC fuse 210 and the central frame portion 108. In particular, the ceramic insert 220 may be an electrical insulator and a thermal insulator, where the ceramic insert thermally isolates a crowbar device of the device chip 112 from the PTC fuse 210.

The apparatus 200 may also include an upper clip 214 disposed on a first side 230 of the central frame portion 108 and a lower clip 216 disposed on a second side 232 of the central frame portion 108 opposite the first side 230. In this manner, the input terminal 204 may be affixed to a lower side 234 of the PTC fuse, where the lower side 234 faces the central frame portion 108. Additionally, the upper clip 214 is affixed to an upper side 236 of the PTC fuse, opposite the lower side 234. The upper clip 214 and lower clip 216 may be a metal such as copper, copper alloy or other conductor, and may have a bent structure as shown. This bent structure may be useful to accommodate expansion of movement of components, for example, when heating occurs during an overvoltage condition.

Figure 3:
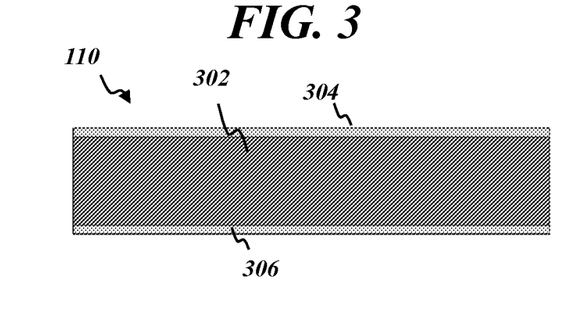
FIG. 3 shows one variant of the PTC fuse shown in FIG. 1A.

Turning now to FIG. 3, there is shown one variant of the PTC fuse 110. In this embodiment, the PTC fuse 110 includes a PTC body 302, where the PTC body 302 may be made from a known polymer based PTC fuse material, as discussed above. The PTC fuse 110 of FIG. 3 also includes a first contact electrode 304 and a second contact electrode 306, where the second contact electrode 306 is disposed opposite the first contact electrode 304. Referring again to FIG. 1A, the first contact electrode 304 may accordingly be electrically connected to the input terminal 104 via the first clip 114 and the second contact electrode may be connected to the central frame portion 108.

Figure 4:
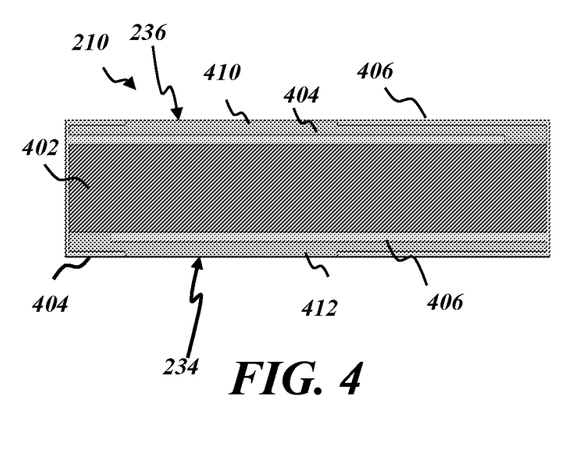
FIG. 4 shows one variant of the PTC fuse shown in FIG. 2A.

Turning now to FIG. 4, there is shown one variant of the PTC fuse 210. In this embodiment, the PTC fuse 210 includes a PTC body 402, where the PTC body 402 may be made from a known polymer based PTC fuse material, as discussed above. The PTC fuse 210 of FIG. 4 also includes a first contact electrode 404 and a second contact electrode 406. As shown in FIG. 4, major portions of the first contact electrode 404 and the second contact electrode 406 are disposed opposite one another along the upper side 236 and lower side 234, respectively. Additionally, other portions of the first contact electrode 404 and second contact electrode 406 extend in a wrap-around fashion toward respective opposite sides of the PTC fuse as shown. Referring also to FIG. 2A, using the embodiment of PTC fuse 210 in FIG. 4, the wrap-around structure of the first contact electrode 404 and second contact electrode 406 facilitate a convenient contacting arrangement wherein the input terminal 204 is affixed to the lower side 234 of the PTC fuse 210, and wherein the upper clip 214 is affixed to the upper side 236 of the PTC fuse, where the upper side 236 is opposite the lower side 234.

As further depicted in FIG. 4, the PTC fuse 210 may include a printed circuit board 410 (PCB) on the upper side 236 and a printed circuit board 412 on the lower side 234, where the first contact electrode 404 is formed integrally with the printed circuit board 410 and where the second contact electrode 406 is formed integrally with the printed circuit board 412.

In operation, both the apparatus 100 and apparatus 200 may perform similarly to rapidly clamp voltage in an overvoltage/overcurrent event, and to ensure proper resetting of thryistor-type devices. One difference between the two apparatus is the extra thermal isolation provided between the device chip 112 and PTC fuse 210 in the apparatus 200 by means of the ceramic insert 220.

The arrangement of apparatus 100 and apparatus 200 provides a compact device for protection against energy surges and may be assembled in a convenient manner according to various embodiments of the disclosure.

Figure 5A:
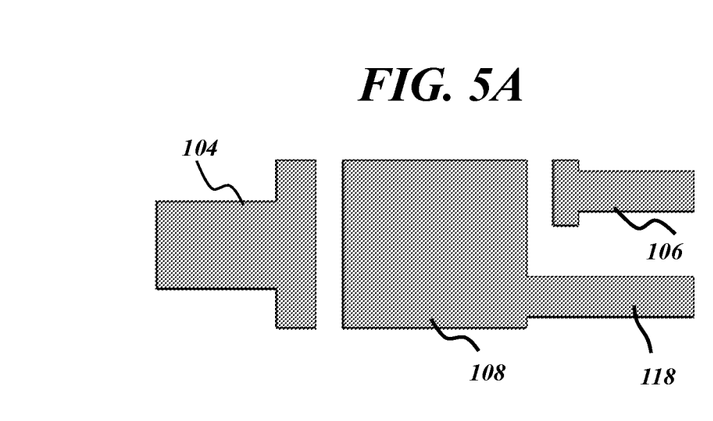
FIG. 5A to FIG. 5J illustrate a flow for assembly of the apparatus of FIG. 1A according to some embodiments of the disclosure.
Figure 5B:
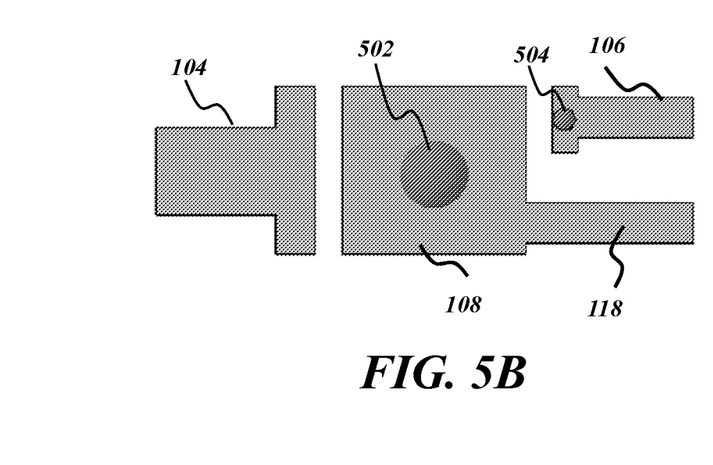
Figure 5C:
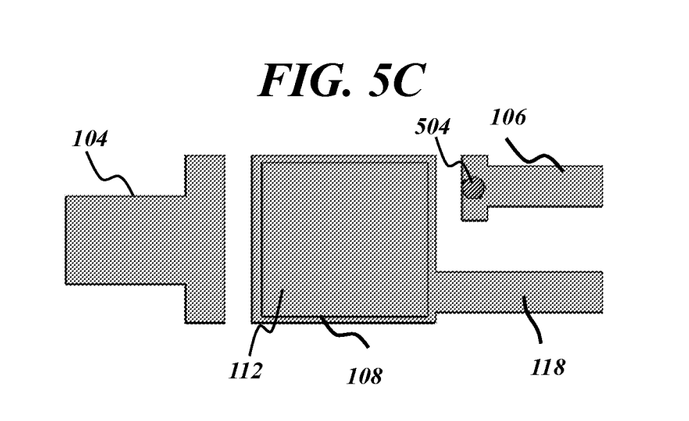
Figure 5D:
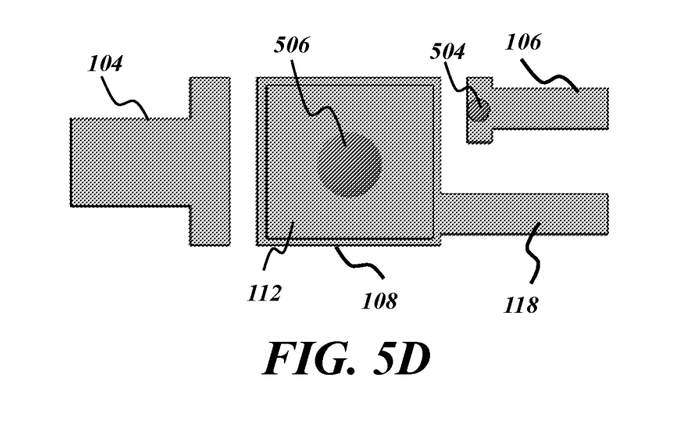

FIG. 5A to FIG. 5J illustrate a flow for assembly of the apparatus 100 according to some embodiments of the disclosure. In FIG. 5A, there is shown an initial arrangement of input terminal 104, output terminal 118, and central frame portion 108 before assembly. The arrangement is shown in bottom plan view, meaning that the view is toward the bottom of the apparatus to be assembled as shown, for example, in FIG. 1A. In this embodiment, the central frame portion 108 and output terminal 118 are formed within a common metallic piece. Turning to FIG. 5B, there is shown an operation of dispensing solder paste for connections to the central frame portion 108 and ground terminal 106. As shown, a solder paste bump 502 is provided on the central frame portion, while a solder paste bump 504 is provided on the ground terminal 106. In FIG. 5C, a subsequent operation is performed of attaching the device chip 112 to the central frame portion 108. In FIG. 5D, a subsequent operation is performed of providing a solder paste bump 506 on the exposed surface of device chip 112.

Figure 5E:
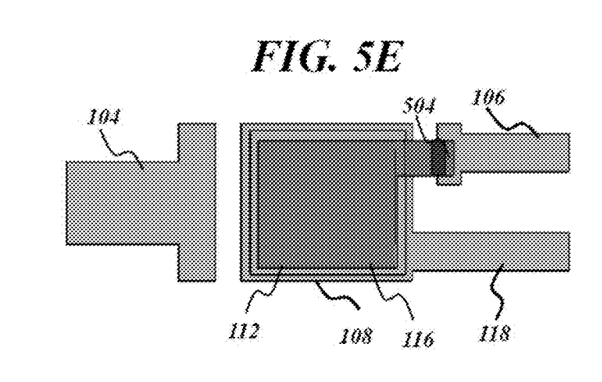

Turning now to FIG. 5E, there is shown an operation of connecting the second clip 116 (lower clip) to the device chip 112 and the ground terminal 106. In this operation, the solder paste bump 502 is heated to the appropriate temperature to form a solder connection between the central frame portion 108 and the device chip 112. In addition, in this operation, the solder paste bump 506 and solder paste bump 504 are heated to an appropriate temperature to form a solder connection between the device chip 112 and second clip 116 in a main portion of the second clip 116, and to form another solder connection between the ground terminal 106 and arm portion of the second clip 116. For example, solder reflow may be performed in a certain profile with the peak temperature at 350° C. The embodiments are not limited in this context.

Figure 5F:
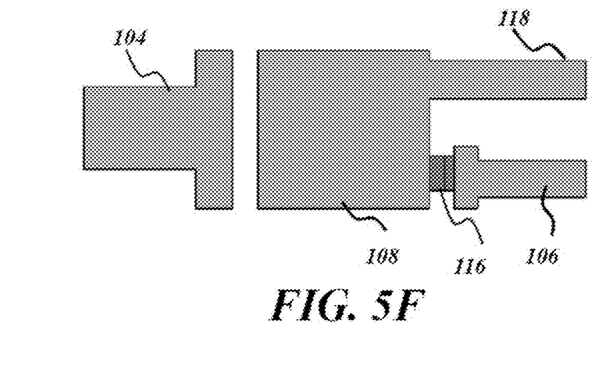
Figure 5G:
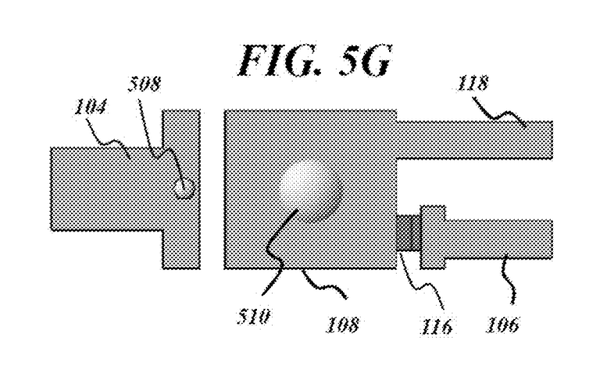
Figure 5H:
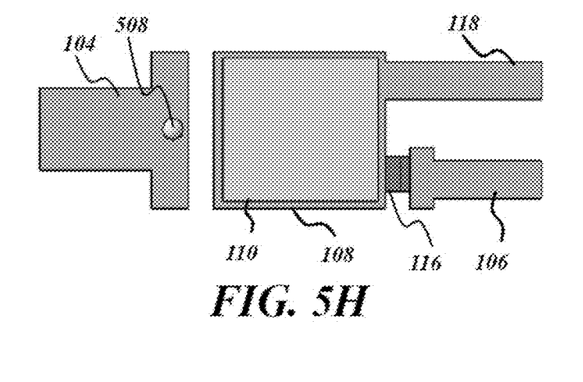
Figure 5I:
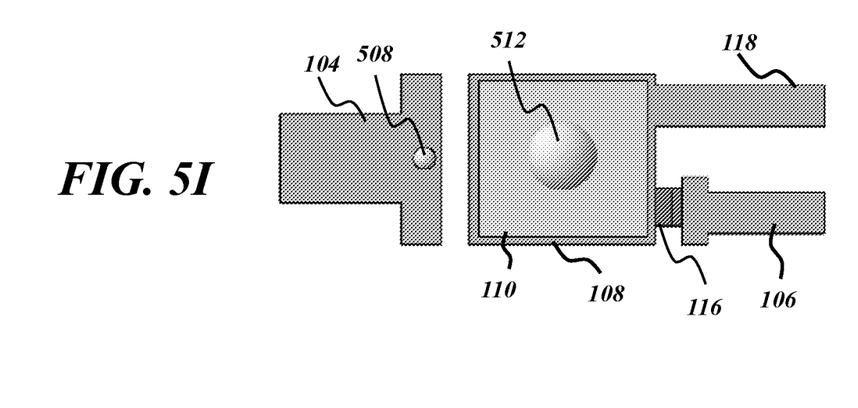
Figure 5J:
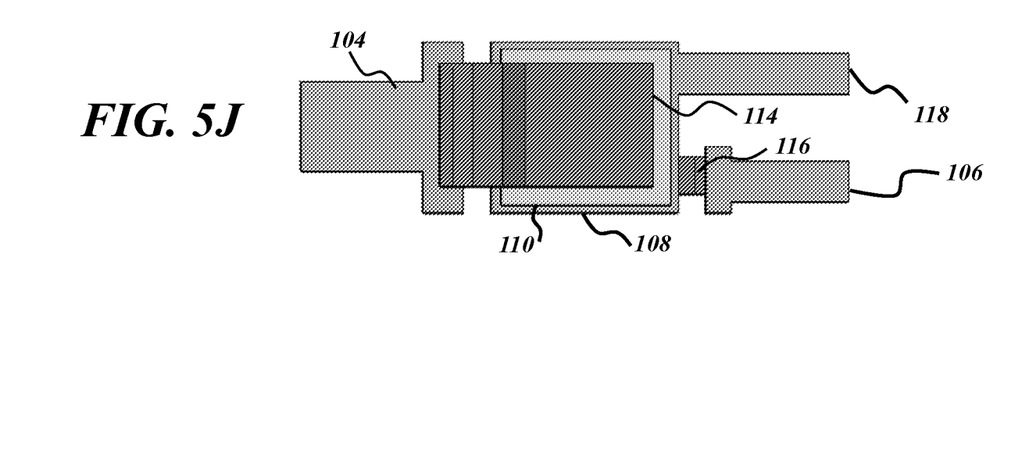

Turning now to FIG. 5F, there is shown a top plan view of the same structure as shown in FIG. 5E, where the perspective is flipped. In operation, the structure of FIG. 5E may be flipped so conductive adhesive may be conveniently dispensed on the surfaces shown in FIG. 5F. In FIG. 5G, there is shown a subsequent operation, where a conductive epoxy connection, shown as conductive epoxy bump 510, such as silver epoxy, is provided on central frame portion 108 while a conductive epoxy bump 508 is provided on input terminal 104. In FIG. 5H, a subsequent operation is performed of placing the PTC fuse 110 on or adjacent to the central frame portion 108. In FIG. 5I, a subsequent operation is performed of providing a conductive epoxy bump 512 on the exposed surface of the PTC fuse 110. In FIG. 5J, the operation is performed of connecting the first clip 114 to the PTC fuse 110 and the input terminal 104. In this operation, the conductive epoxy bump 510 is heated to an appropriate temperature to form an electrically conductive connection, specifically a conductive epoxy connection, between the PTC fuse 110 and the central frame portion 108. In addition, in this operation the conductive epoxy bump 512 and conductive epoxy bump 508 are heated to an appropriate temperature to form a connection between the PTC fuse 110 and first clip 114 (upper clip) in a main portion of the upper first 114, and to form another electrically conductive connection between the input terminal 104 and arm portion of the first clip 114. For example, a curing anneal may be performed at 175° C. The embodiments of the device structure and the assembly flow to form such embodiments are not limited in this context.

Figure 6A:
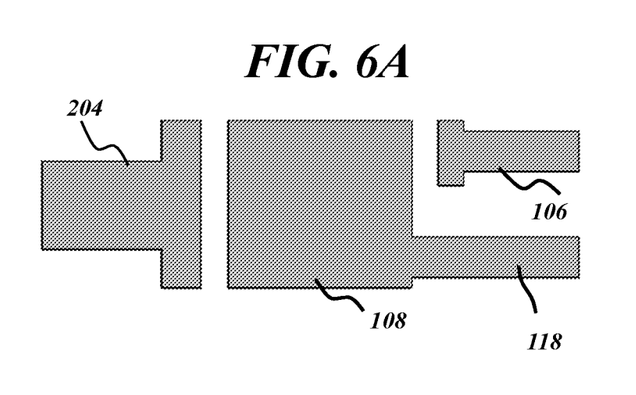
FIG. 6A to FIG. 6L illustrate a flow for assembly of the apparatus of FIG. 2A according to some embodiments of the disclosure.
Figure 6B:
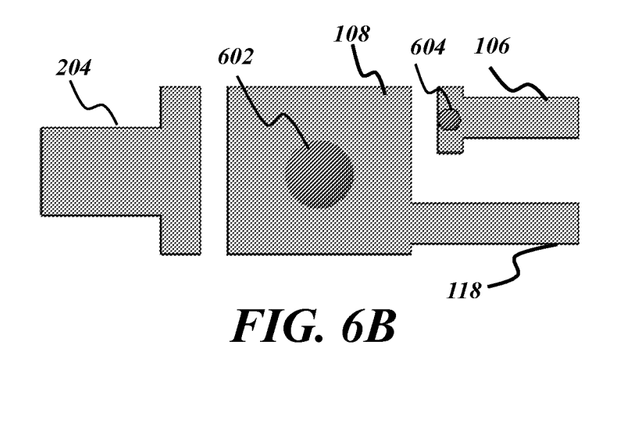
Figure 6C:
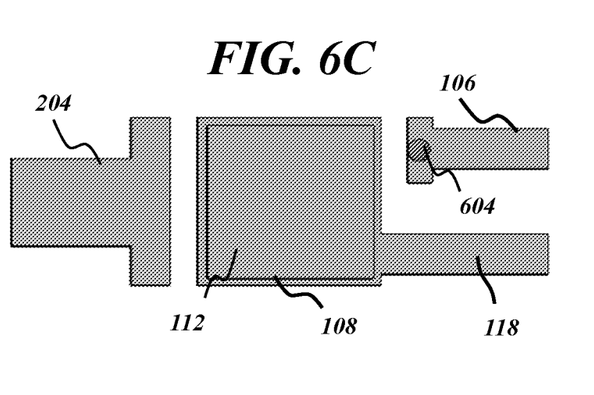

FIG. 6A to FIG. 6L illustrate a flow for assembly of the apparatus 200 according to some embodiments of the disclosure. In FIG. 6A, there is shown an initial arrangement of input terminal 204, output terminal 118, and central frame portion 108 before assembly. The arrangement is shown in bottom plan view, meaning that the view is toward the bottom of the apparatus to be assembled as shown, for example, in FIG. 2A. In this embodiment, the central frame portion 108 and output terminal 118 are formed within a common metallic piece. Turning to FIG. 6B, there is shown an operation of dispensing solder paste for connections to the central frame portion 108 and ground terminal 106. As shown, a solder paste bump 602 is provided on the central frame portion, while a solder paste bump 604 is provided on the ground terminal 106. In FIG. 6C, a subsequent operation is performed of placing the device chip 112 on or adjacent to the central frame portion 108.

Figure 6D:
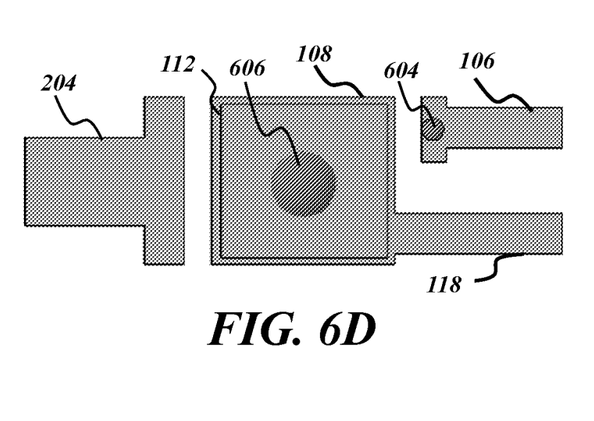
Figure 6E:
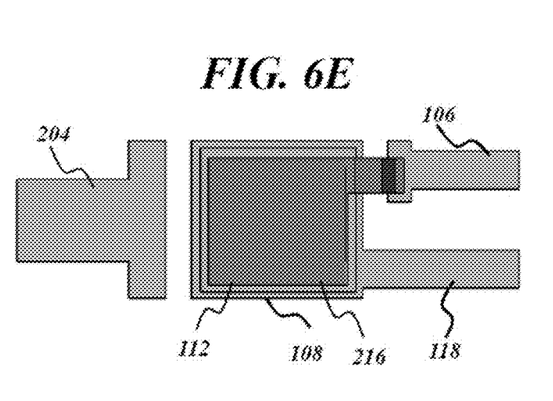

In FIG. 6D, a subsequent operation is performed of providing a solder bump 606 on the exposed surface of device chip 112. Turning now to FIG. 6E, there is shown an operation of connecting the lower clip 216 to the device chip 112 and the ground terminal 106. In this operation, the solder paste bump 602 is heated to an appropriate temperature to form a solder connection between the central frame portion 108 and the device chip 112. In addition, in this operation, the solder bump 606 and solder paste bump 604 are heated to an appropriate temperature to form a solder connection between the device chip 112 and lower clip 216 in a main portion of the lower clip 216, and to form another solder connection between the ground terminal 106 and arm portion of the lower clip 216.

Figure 6F:
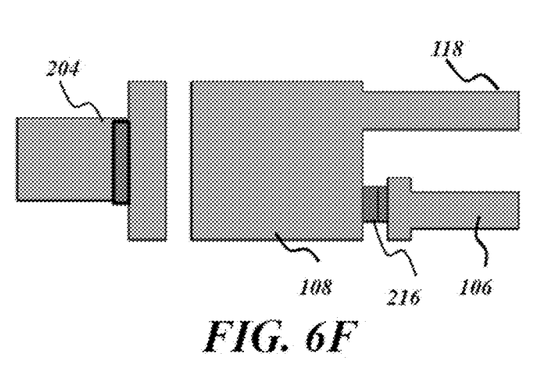
Figure 6G:
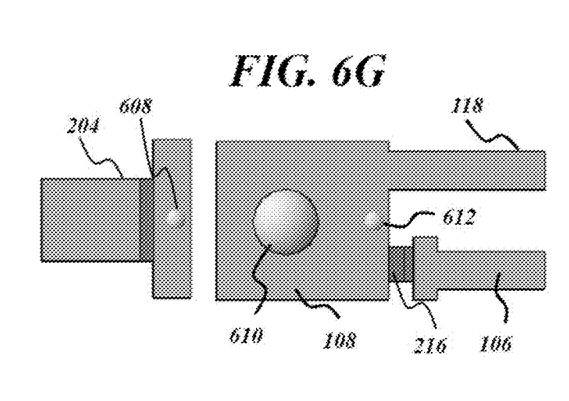
Figure 6H:
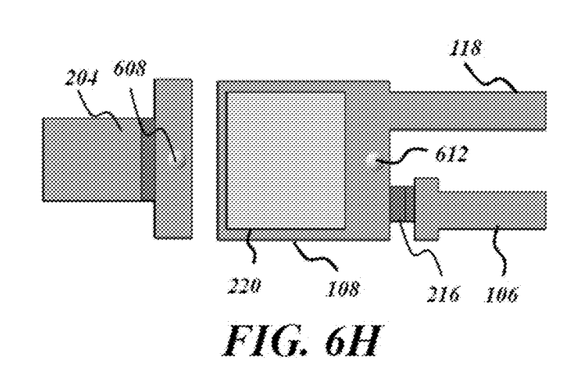
Figure 6I:
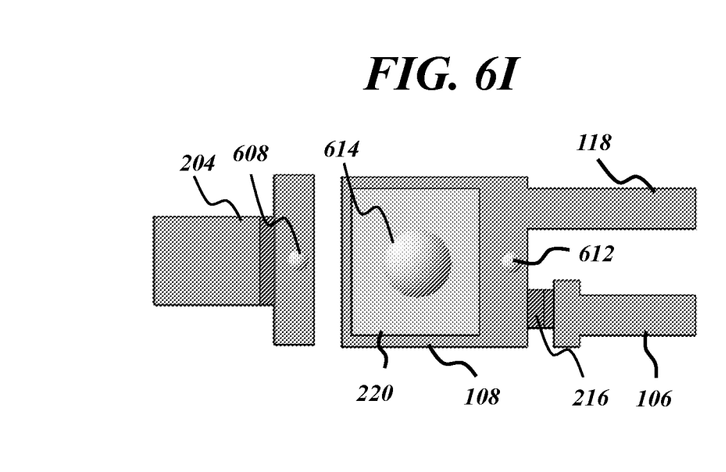

Turning now to FIG. 6F, there is shown a top plan view of the same structure as shown in FIG. 6E, where the perspective is flipped. In operation, the structure of FIG. 6E may be flipped so solder may be conveniently dispensed on the surfaces shown in FIG. 6F. In FIG. 6G, there is shown a subsequent operation, where an adhesive epoxy bump 610 is provided on a first region of central frame portion 108 while a conductive epoxy bump 612 is provided on a second region of central frame portion 108. Additionally, a conductive epoxy bump 608 is provided on input terminal 204. In FIG. 6H, the operation of attaching a ceramic insert 220 is performed where the adhesive epoxy bump 610 and central frame portion 108 are joined to the ceramic insert 220. Turning to FIG. 6I, the operation is shown of dispensing an adhesive epoxy bump 614 on the exposed surface of ceramic insert 220.

Figure 6J:
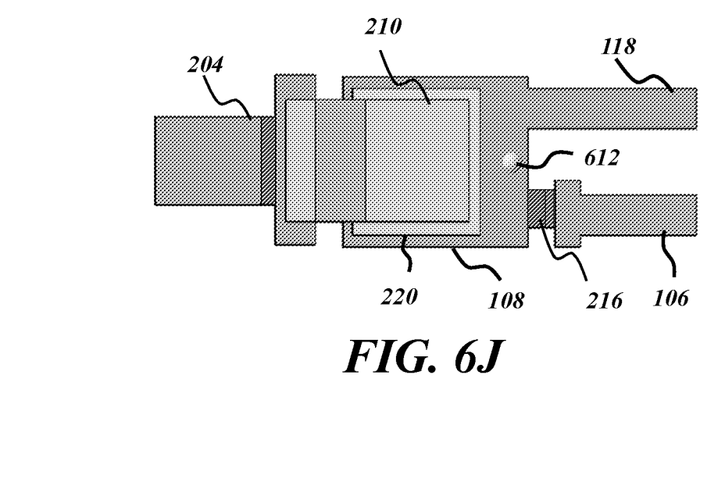
Figure 6K:
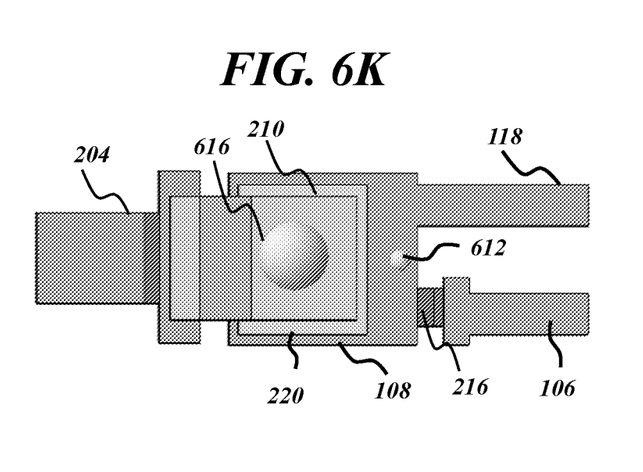

In a subsequent operation shown in FIG. 6J, the PTC fuse 210 is attached to the ceramic insert 220 and to the input terminal 204, using the adhesive epoxy bump 614 and conductive epoxy bump 608. In FIG. 6K, a conductive epoxy bump 616 is dispensed on the exposed surface of the PTC fuse 210 in a region over a metallized portion of the PTC fuse 210 lying above the ceramic insert 220.

Figure 6L:
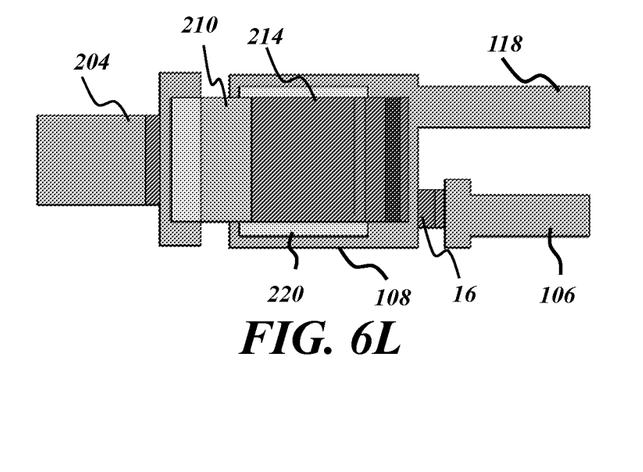

In FIG. 6L, the operation is performed of connecting the upper clip 214 to the PTC fuse 210 and an edge region of the central frame portion 108. In this operation, a curing anneal is performed to form the solid connection of each portion through the adhesive and/or conductive epoxy bumps. The conductive epoxy bump 616 and conductive epoxy bump 612 are heated to an appropriate temperature to form an electrically conductive connection between the PTC fuse 210 and upper clip 214 in a main portion of the upper clip 214, and to form another electrically conductive connection between the central frame portion 108 and bent portion of the upper clip 214. In some embodiments this operation may be performed at 200° C.

In each of the flows depicted in FIGS. 5A-5J and 6A-6L, a final operation may be performed where a housing 102 is formed to encase all other components save for outer ends of the input terminals, output terminals, and ground terminals, to form a completed apparatus as shown in FIGS. 1A and 2A. In some embodiments, the housing 102 may be a mold material formed at a temperature of 175° C. The embodiments are not limited in this context.

While the present embodiments have been disclosed with reference to certain embodiments, numerous modifications, alterations and changes to the described embodiments are possible without departing from the sphere and scope of the present disclosure, as defined in the appended claims. Accordingly, it is intended that the present embodiments not be limited to the described embodiments, and that it has the full scope defined by the language of the following claims, and equivalents thereof.

What is claimed is:

1. A surge protection apparatus, comprising:
an input terminal;
an output terminal, the output terminal electrically coupled to the input terminal;
a ground terminal, the ground terminal electrically coupled to the input terminal and the output terminal;
a positive temperature coefficient (PTC) fuse, the PTC fuse connected in electrical series between the input terminal and the output terminal;
a crowbar device, the crowbar device electrically connected to the ground terminal and the output terminal, wherein the crowbar device is in electrical series with the PTC fuse between the input terminal and the ground terminal; and
a central frame portion, the central frame portion electrically coupled to the input terminal, the output terminal and the ground terminal, wherein the crowbar device is disposed on a first side of the central frame portion and the PTC fuse is disposed on a second side of the central frame portion, in direct contact with the central frame portion, opposite the first side;

wherein the output terminal and an entirety of the central frame portion are a single, contiguous body, and wherein the input terminal, the output terminal, the ground terminal, and the central frame portion, including portions of the output terminal, the ground terminal, and the central frame portion that are in direct contact with the PTC fuse and the crowbar device, are coplanar.

2. The surge protection apparatus of claim 1, wherein the PTC fuse comprises a PTC body, a first electrode disposed on a first side of the PTC body, and a second electrode disposed on a second side of the PTC body.

3. The surge protection apparatus of claim 1, further comprising a first clip, the first clip electrically connected to the input terminal and the PTC fuse, and a second clip, the second clip electrically connected to the crowbar device and the ground terminal.

4. The surge protection apparatus of claim 3, wherein the first clip and second clip comprise a bent structure.

5. The surge protection apparatus of claim 3, wherein the first clip is connected to the input terminal and the PTC fuse via a first conductive epoxy connection and a second conductive epoxy connection, respectively, and wherein the second clip is connected to the crowbar device and the ground terminal via a first solder connection and a second solder connection.

6. The surge protection apparatus of claim 1 further comprising a ceramic insert disposed between the PTC fuse and the central frame portion, the ceramic insert thermally isolating the crowbar device from the PTC fuse.

7. The surge protection apparatus of claim 6, further comprising an upper clip disposed on a first side of the central frame portion and a lower clip disposed on a second side of the central frame portion opposite the first side;

wherein the input terminal is affixed to a lower side of the PTC fuse, the lower side facing the central frame portion, and wherein the upper clip is affixed to an upper side of the PTC fuse, the upper side being opposite the lower side.

8. The surge protection apparatus of claim 7, wherein the PTC fuse comprises a PTC body, a first contact electrode, and a second contact electrode, the first contact electrode being connected to the input terminal and the second contact electrode being connected to the upper clip.

9. A method of forming a surge protection apparatus, comprising:

providing an input terminal, an output terminal, and a central frame portion, wherein the output terminal and an entirety of the central frame portion are a single, contiguous body;

soldering a first side of a semiconductor chip comprising a crowbar device to a first side of the central frame portion;

soldering a first portion of a first clip to a second side of the semiconductor chip, the second side being opposite the first side of the semiconductor chip, and soldering a second portion of the first clip to a ground terminal;

affixing a first side of a positive temperature coefficient (PTC) fuse directly to a second side of the central frame portion, the second side of the central frame portion being opposite the first side of the central frame portion, using a conductive medium;

affixing a first portion of a second clip to a second side of the PTC fuse, the second side being opposite the first side of the PTC fuse; and affixing a second portion of the second clip to the input terminal;

wherein the input terminal, the output terminal, the ground terminal, and the central frame portion, including portions of the output terminal, the ground terminal, and the central frame portion that are in direct contact with the PTC fuse and the semiconductor device, are coplanar.

10. The method of claim 9, wherein the PTC fuse comprises:

a PTC body, a first electrode disposed on the first side of the PTC body, and a second electrode disposed on the second side of the PTC body.

* * * * *